United States Patent
Liang et al.

(10) Patent No.: US 11,387,643 B2
(45) Date of Patent: Jul. 12, 2022

(54) METHOD, DEVICE AND SYSTEM FOR PROTECTING PARALLEL-CONNECTED TOPOLOGY UNITS

(71) Applicant: SUNGROW POWER SUPPLY CO., LTD., Anhui (CN)

(72) Inventors: Cheng Liang, Hefei (CN); Nianan Pan, Hefei (CN); Zhicheng Wang, Hefei (CN); Lin Cheng, Hefei (CN); Longlin Sun, Hefei (CN); Jigui Feng, Hefei (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 16/959,982

(22) PCT Filed: Dec. 31, 2019

(86) PCT No.: PCT/CN2019/130494
§ 371 (c)(1),
(2) Date: Jul. 2, 2020

(87) PCT Pub. No.: WO2020/192224
PCT Pub. Date: Oct. 1, 2020

(65) Prior Publication Data
US 2021/0257830 A1    Aug. 19, 2021

(30) Foreign Application Priority Data

Mar. 27, 2019  (CN) .......................... 201910237668.0

(51) Int. Cl.
*H02H 7/122* (2006.01)
(52) U.S. Cl.
CPC .................. *H02H 7/1225* (2013.01)
(58) Field of Classification Search
CPC ......... H02H 7/1225; H02M 7/00; H02M 3/24
(Continued)

(56) References Cited

U.S. PATENT DOCUMENTS 3,823,362 A * 7/1974 Bailey ................... H02M 7/162
363/72
4,208,691 A * 6/1980 Rogowsky ........... H02H 7/1206
361/79

(Continued)

FOREIGN PATENT DOCUMENTS

CN    203117691 U    8/2013
CN    103368182 A   10/2013
(Continued)

OTHER PUBLICATIONS

International Search Report and Written Opinion of the International Searching Authority (in Chinese) issued in PCT/CN2019/130494, dated Mar. 31, 2020; ISA/CN.
(Continued)

*Primary Examiner* — Yemane Mehari
(74) *Attorney, Agent, or Firm* — Harness, Dickey & Pierce, P.L.C.

(57) ABSTRACT

A method, a device, and a system for protecting parallel-connected topology units are provided. A target signal transmitted via the signal synchronization line is obtained, and the target signal is sent to other controllers based on a type of the target signal. If the target signal is a carrier synchronization signal, the current power module is controlled to perform carrier synchronization and to be in a working mode. If the target signal is a power module fault signal, the current power module is controlled to be in a shutdown mode. The signal synchronization lines between the parallel-connected topology units are shared in a time-sharing manner, where the carrier synchronization signal is transmitted if the power module works normally, and the power module fault signal is transmitted if the power module is faulty. The topology units monitor the transmitted target signal in real time for fast synchronous protection.

10 Claims, 15 Drawing Sheets

(58) Field of Classification Search
USPC .......................................................... 363/50
See application file for complete search history.

(56) References Cited

U.S. PATENT DOCUMENTS

| | | | | |
|---|---|---|---|---|
| 6,285,572 | B1* | 9/2001 | Onizuka | H02J 3/381 |
| | | | | 363/72 |
| 7,327,588 | B2* | 2/2008 | Ollila | H02M 7/493 |
| | | | | 363/71 |
| 2005/0128667 | A1 | 6/2005 | Okada et al. | |
| 2012/0063180 | A1* | 3/2012 | Mizuno | H02H 7/12 |
| | | | | 363/50 |
| 2016/0322917 | A1* | 11/2016 | Matsuoka | H02M 1/36 |

FOREIGN PATENT DOCUMENTS

| | | |
|---|---|---|
| CN | 104486059 A | 4/2015 |
| CN | 104950765 A | 9/2015 |
| CN | 105391089 A | 3/2016 |
| CN | 105743634 A | 7/2016 |
| CN | 106067848 A | 11/2016 |
| CN | 109302091 A | 2/2019 |
| CN | 109787464 A | 5/2019 |
| JP | H081350 A | 1/1996 |
| JP | 2005176558 A | 6/2005 |
| JP | 2012175845 A | 9/2012 |
| JP | 2019024300 A | 2/2019 |

OTHER PUBLICATIONS

First Office Action issued in CN-201910237668.0, dated Oct. 11, 2019 with English Translation.
First Japanese Office Action regarding Application No. 2020-528884 dated Jul. 27, 2021. English translation provided by Unitalen Attorneys at Law.
Extended European Search Report regarding Application No. 19897575.7 dated Jan. 4, 2022.
C.L. Toh et al., "Implementation of High Speed Control Network with Fail-Safe Control and Communication Cable Redundancy in Modul Multilevel Converter," 2013, 15th European Conference on Power Electronics and Applications (EPE), pp. 1-10.
Fourth Chinese Office Action regarding Application No. 201910237668.0 dated Feb. 8, 2022. English translation provided by Unitalen Attorneys at Law.
Xue Qian et al., "Multiplexing Technology," Computer Network Security, Metallurgical Industry Press, Sep. 30, 2016, pp. 36-37.

* cited by examiner

METHOD, DEVICE AND SYSTEM FOR PROTECTING PARALLEL-CONNECTED TOPOLOGY UNITS

CROSS-REFERENCE TO RELATED APPLICATIONS

The present application is the U.S. National Phase Application under 35 U.S.C. 371 of International Application No. PCT/CN2019/130494 filed on Dec. 31, 2019, which claims priority to Chinese Patent Application No. 201910237668.0, titled "METHOD, DEVICE AND SYSTEM FOR PROTECTING PARALLEL-CONNECTED TOPOLOGY UNITS", filed on Mar. 27, 2019 with the China National Intellectual Property Administration. The entire disclosures of the above applications are incorporated herein by reference in their entirety.

TECHNICAL FIELD

The present disclosure relates to the technical field of new energy, and in particular to a method, a device, and a system for protecting parallel-connected topology units.

BACKGROUND

In order to meet the requirement for high power, multiple topology units are connected in parallel in a power electronic converter system to achieve rapid expansion of capacity. As shown in FIG. 1, input terminals of two topology units are connected in parallel, and output terminals of the two topology units are also connected in parallel.

However, due to the input terminals connected in parallel and the output terminals connected in parallel, a fault of one of the topology units in the power electronic converter system causes a fault current passing through the other topology unit as shown in FIG. 2, resulting in a short circuit in the system, which damages the other topology unit.

Currently, as shown in FIG. 3, fault protection may be performed by connecting a fuse in series in the topology unit. Alternatively, as shown in FIG. 4, a communication line may be established between topology units. Fault information is transmitted via the communication line when fault occurs in one topology unit, thereby avoiding damaging the other topology unit.

However, the inventors found that, with the fault protection shown in FIG. 3, multiple fuses are required since the power electronic converter system generally includes multiple topology units. In addition, the fuse of a faulty topology needs to be replaced, increasing the cost of a power electronic converter and causing difficulties in maintenance. With the fault protection shown in FIG. 4, it is required to establish a communication line between the topology units, increasing cost of the system. In addition, since the communication line has low signal transmission efficiency, the topology units may not be protected due to a delayed communication signal.

Therefore, the technical problem that is urgently to be solved by those skilled in the art is how to provide a method and a system for protecting parallel-connected topology units for rapidly performing fault protection without increasing the cost of a converter system.

SUMMARY

In view of the above, a method and a system for protecting parallel-connected topology units are provided according to the embodiments of the present disclosure for rapidly performing fault protection without increasing the cost of a converter system.

To achieve the above objective, following technical solutions are provided according to the embodiments the present disclosure.

A method for protecting parallel-connected topology units, applied to a system for protecting parallel-connected topology units is provided. The system for protecting parallel-connected topology units includes topology units connected in parallel, each of the topology units includes a controller and a power module, the controller performs signal transmission with at least one of other controllers via a signal synchronization line, and the method for protecting parallel-connected topology units includes:

obtaining a target signal transmitted via the signal synchronization line, sending the target signal to the other controllers based on a type of the target signal, and controlling a current power module to perform carrier synchronization and controlling the current power module to be in a working mode if the target signal is a carrier synchronization signal, and controlling the current power module to be in a shutdown mode if the target signal is a power module fault signal.

In an embodiment, the method for protecting parallel-connected topology units further includes, if the target signal is the carrier synchronization signal, determining a fault state of the power module. If the fault state is a normal state, the target signal is transmitted to the other controllers, the current power module is controlled to perform carrier synchronization and is controlled to be in the working mode. If the fault state is a faulty state, the power module fault signal is sent to the other controllers and the current power module is controlled to be in the shutdown mode.

In an embodiment, the controller is a single controller, the single controller is connected to the power module via a state acquisition signal line, the single controller acquires the power module fault signal sent by the power module and sends the power module fault signal via the signal synchronization line. Correspondingly, the obtaining the target signal transmitted via the signal synchronization line includes:

acquiring, by the single controller, the carrier synchronization signal or the power module fault signal transmitted via the signal synchronization line, and determining the power module fault signal or the carrier synchronization signal as the target signal.

In an embodiment, the controller includes a first sub-controller and a second sub-controller, the first sub-controller is connected to the second sub-controller via a feedback signal line, the second sub-controller performs signal transmission with at least one of other second sub-controllers via the signal synchronization line, and the second sub-controller is connected to the power module via a state acquisition signal line.

Correspondingly, the second sub-controller obtains the target signal transmitted via the signal synchronization line.

If the target signal is the carrier synchronization signal, the second sub-controller acquires a fault state of the power module via the state acquisition signal line. If the fault state is a normal state, the second sub-controller transmits the target signal to the other second sub-controllers via the signal synchronization line and transmits the target signal to the first sub-controller via the feedback signal line, and the first sub-controller performs carrier synchronization and controls the current power module to be in the working mode. If the fault state is a faulty state, the second sub-controller transmits the power module fault signal to the other second sub-controllers via the signal synchronization line and transmits the power module fault signal to the first sub-controller via the feedback signal line, and the first sub-controller controls the current power module to be in the shutdown mode.

If the target signal is the power module fault signal, the second sub-controller sends the target signal to the other second sub-controllers via the signal synchronization line and transmits the target signal to the first sub-controller via the feedback signal line, and the first sub-controller controls the current power module to be in the shutdown mode.

In an embodiment, the first sub-controller is a DSP and the second sub-controller is a CPLD.

A device for protecting parallel-connected topology units applied to a system for protecting parallel-connected topology units is provided. The system for protecting parallel-connected topology units includes topology units connected in parallel, each of the topology units includes a controller and a power module, the controller performs signal transmission with at least one of other controllers via a signal synchronization line, and the device for protecting parallel-connected topology units includes an obtaining module, a sending module, and a control module.

The obtaining module is configured to obtain a target signal transmitted via the signal synchronization line, The sending module is configured to send the target signal to the other controllers based on a type of the target signal.

The control module is configured to control a current power module to perform carrier synchronization and control the current power module to be in a working mode if the target signal is a carrier synchronization signal, and control the current power module to be in a shutdown mode if the target signal is a power module fault signal.

In an embodiment, the device for protecting parallel-connected topology units further includes a determining module. The determining module is configured to, if the target signal is the carrier synchronization signal, determine a fault state of the power module. The determining module is configured to transmit the target signal to the other controllers, control the current power module to perform carrier synchronization and control the current power module to be in the working mode if the fault state is a normal state, and send the power module fault signal to the other controllers and control the current power module to be in the shutdown mode if the fault state is a faulty state.

In an embodiment, the controller is a single controller, the single controller is connected to the power module via a state acquisition signal line, the single controller acquires the power module fault signal sent by the power module and sends the power module fault signal via the signal synchronization line. The obtaining module includes: a first acquiring unit and a determining unit.

The first acquiring unit is configured to acquire, by controller, the carrier synchronization signal or the power module fault signal transmitted via the signal synchronization line, and The determining unit is configured to determine the power module fault signal or the carrier synchronization signal as the target signal.

A system for protecting parallel-connected topology units is provided. The system including topology units connected in parallel, each of the topology units includes a controller and a power module, the controller performs signal transmission with at least one of other controllers via a signal synchronization line.

The controller obtains a target signal transmitted via the signal synchronization line.

The controller sends the target signal to the other controllers based on a type of the target signal. The controller controls a current power module to perform carrier synchronization and controls the current power module to be in a working mode if the target signal is a carrier synchronization signal, and controls the current power module to be in a shutdown mode if the target signal is a power module fault signal.

In an embodiment, the controller is a single controller, the single controller is connected to the power module via a state acquisition signal line, the single controller acquires the power module fault signal sent by the power module and sends the power module fault signal via the signal synchronization line. Correspondingly, the controller obtaining the target signal transmitted via the signal synchronization line includes the single controller being configured to:

acquire the carrier synchronization signal or the power module fault signal transmitted via the signal synchronization line, and determine the power module fault signal or the carrier synchronization signal as the target signal.

In an embodiment, the controller includes a first sub-controller and a second sub-controller, the first sub-controller is connected to the second sub-controller via a feedback signal line, the second sub-controller performs signal transmission with at least one of other second sub-controllers via the signal synchronization line, and the second sub-controller is connected to the power module via a state acquisition signal line. Correspondingly, the controller obtaining the target signal transmitted via the signal synchronization line includes:

if the target signal is the carrier synchronization signal, the second sub-controller acquiring a fault state of the power module via the state acquisition signal line. If the fault state is a normal state, the second sub-controller transmits the target signal to the other second sub-controllers via the signal synchronization line and transmits the target signal to the first sub-controller via the feedback signal line, and the first sub-controller performs carrier synchronization and controls the current power module to be in the working mode. If the fault state is a faulty state, the second sub-controller transmits the power module fault signal to the other second sub-controllers via the signal synchronization line and transmits the power module fault signal to the first sub-controller via the feedback signal line, and the first sub-controller controls the current power module to be in the shutdown mode.

If the target signal is the power module fault signal, the second sub-controller sends the target signal to the other second sub-controllers via the signal synchronization line and transmits the target signal to the first sub-controller via the feedback signal line, and the first sub-controller controls the current power module to be in the shutdown mode.

In an embodiment, the first sub-controller is a DSP and the second sub-controller is a CPLD.

Based on the above technical solutions, the method for protecting parallel-connected topology units, applied to a system for protecting parallel-connected topology units, is provided according to the embodiments of the present disclosure. The system for protecting parallel-connected topology units includes topology units connected in parallel. Each of the topology units includes a controller and a power module. The controller performs signal transmission with at least one of other controllers via a signal synchronization line. In the method for protecting parallel-connected topology units, the target signal transmitted via the signal synchronization line is first obtained, and the target signal is sent to the other controllers based on a type of the target signal. If the target signal is the carrier synchronization signal, the current power module is controlled to perform carrier synchronization and is controlled to be in a working mode. If the target signal is the power module fault signal, the current power module is controlled to be in the shutdown mode. It can be seen that in the present disclosure, the signal synchronization lines between the topology units connected in parallel are shared in a time-sharing manner. The carrier synchronization signal is transmitted via the signal synchronization line if the power module works normally, and the power module fault signal is transmitted via the signal synchronization line if the power module is faulty. Each of the topology units monitors the transmitted target signal in a real time manner to achieve fast synchronous protection.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF THE EMBODIMENTS

Figure 1:
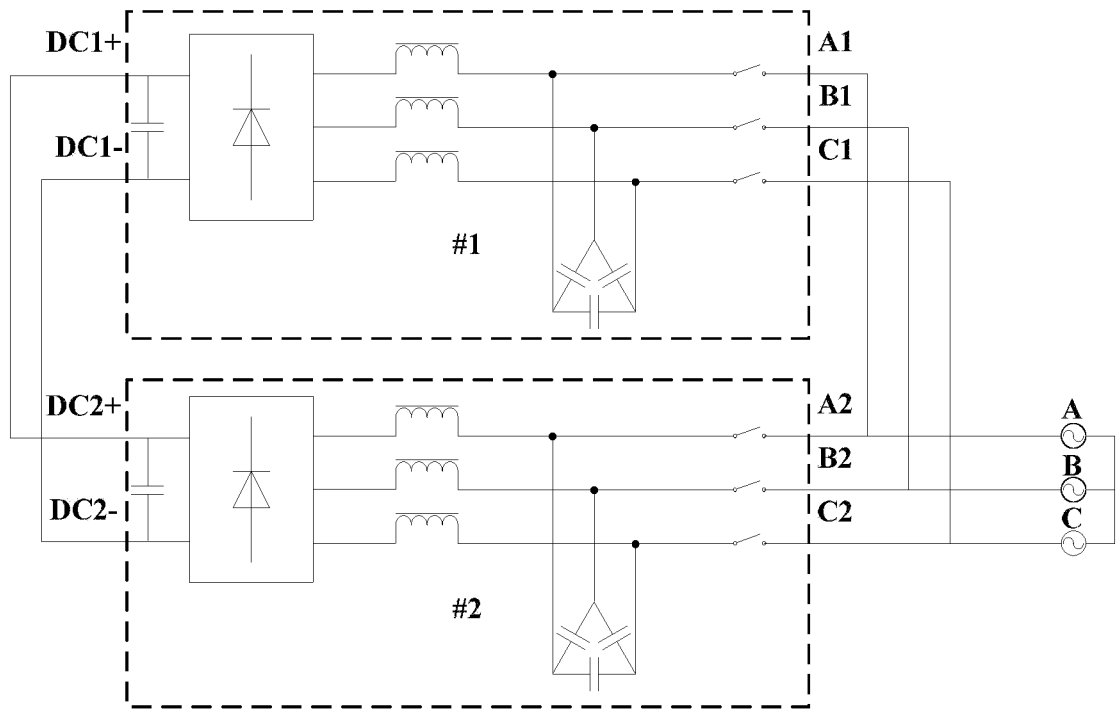
FIG. 1 is a schematic structural diagram of a topology unit in the conventional technology.
Figure 2:
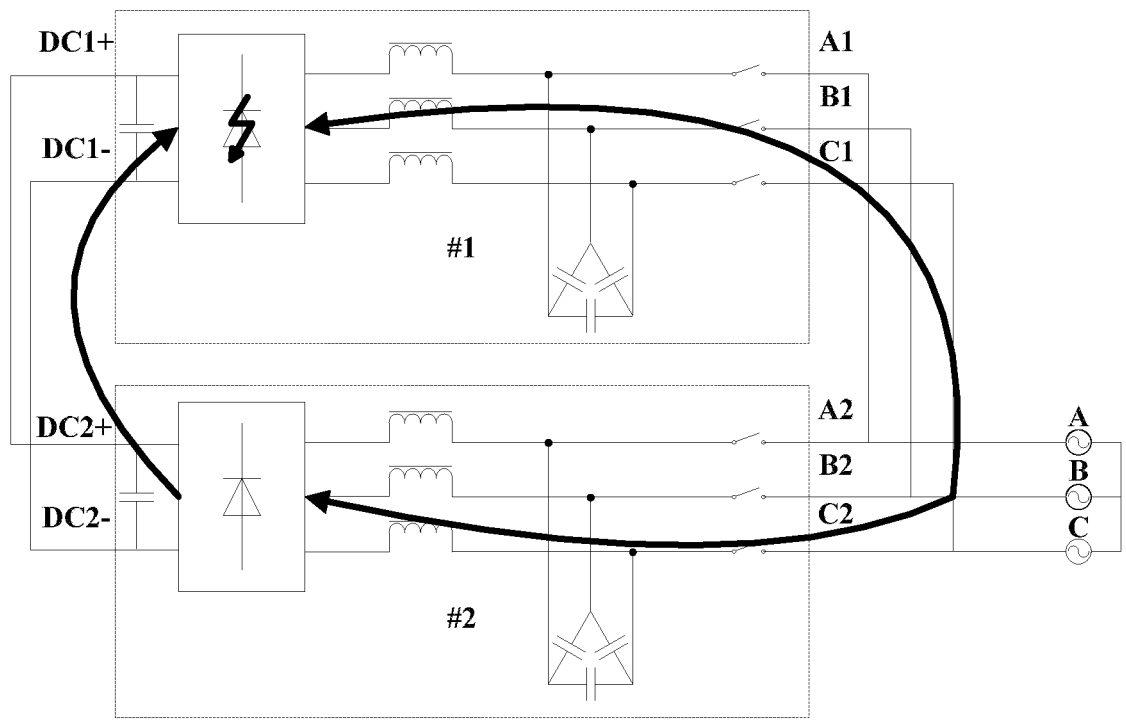
FIG. 2 is a schematic diagram of a faulty topology unit in the conventional technology.
Figure 3:
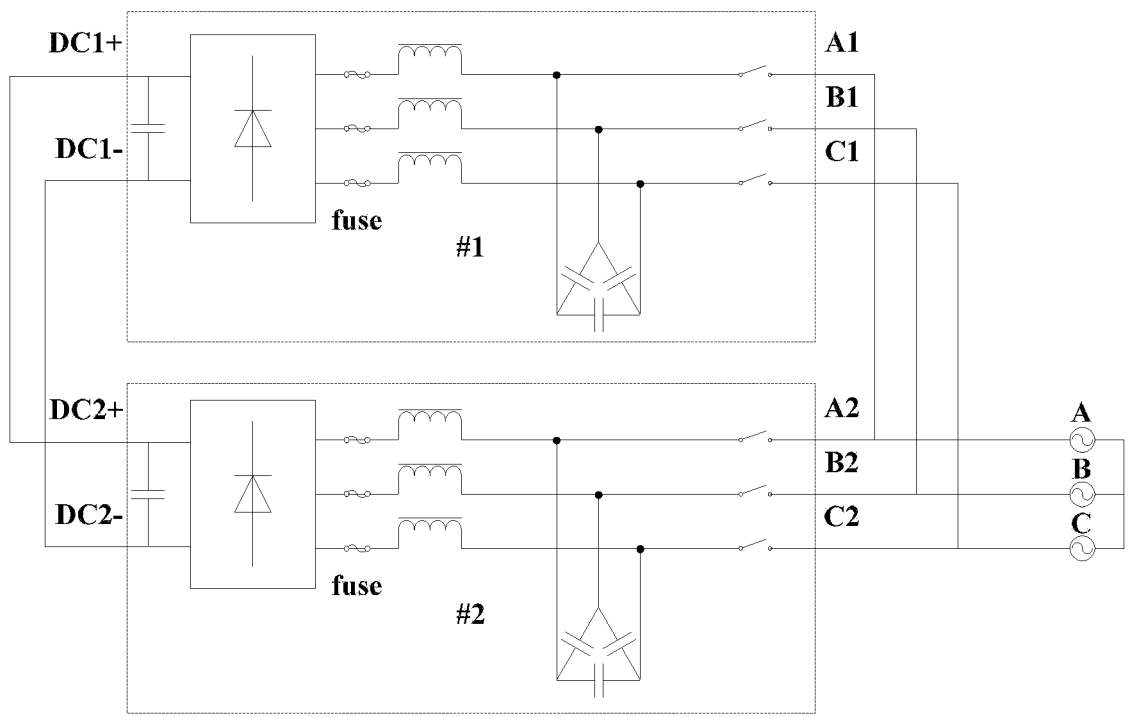
FIG. 3 is a schematic structural diagram of another topology unit in the conventional technology.
Figure 4:
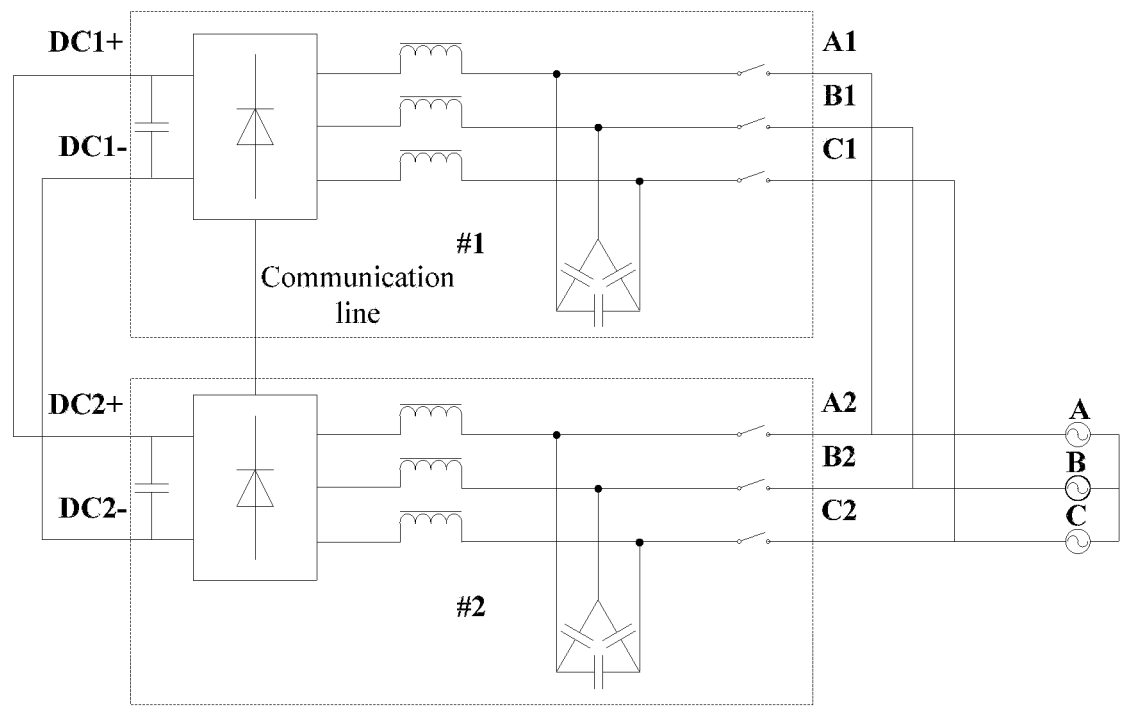
FIG. 4 is a schematic structural diagram of another topology unit in the conventional technology.
Figure 5:
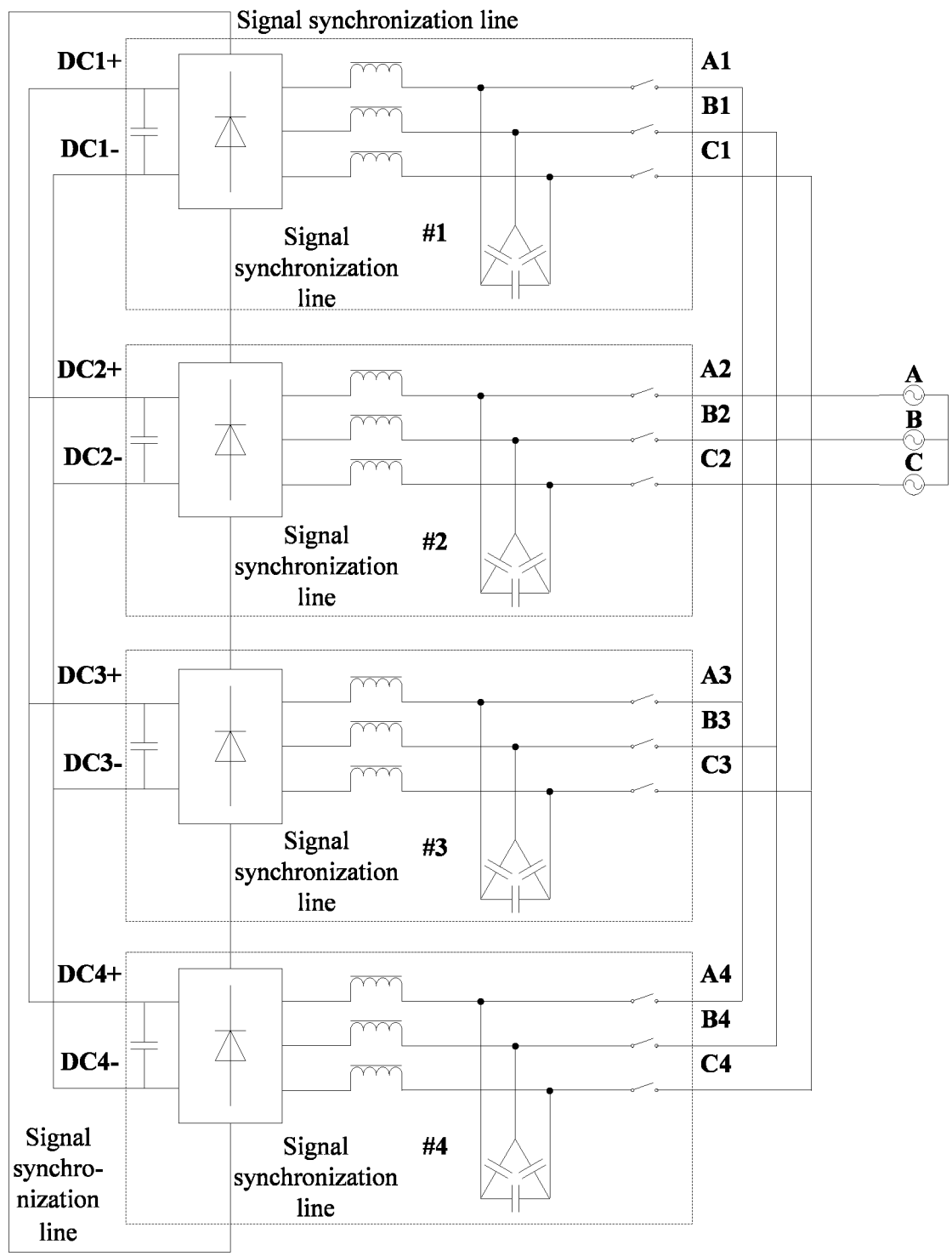
FIG. 5 is a schematic structural diagram of a system for protecting parallel-connected topology units according to an embodiment of the present disclosure.

Reference is made to FIG. 5, which is a schematic structural diagram of a system for protecting parallel-connected topology units according to an embodiment of the present disclosure. The system for protecting parallel-connected topology units includes multiple topology units connected in parallel. Signal synchronization lines are arranged between the multiple topology units for transmitting carrier synchronization signals, thereby implementing PWM carrier synchronization and suppressing circulating currents. In the embodiment, the topology unit may be an inverter unit, a rectifier, or a DC/DC converter. In this embodiment, an inverter unit is used as an example of the topology unit for describing the principle of a method for protecting parallel-connected topology units according to the present disclosure. In addition, the signal synchronization lines may be implemented by optical fibers or wires for transmitting an optical signal or an electrical signal at high transmission rates.

Figure 6:
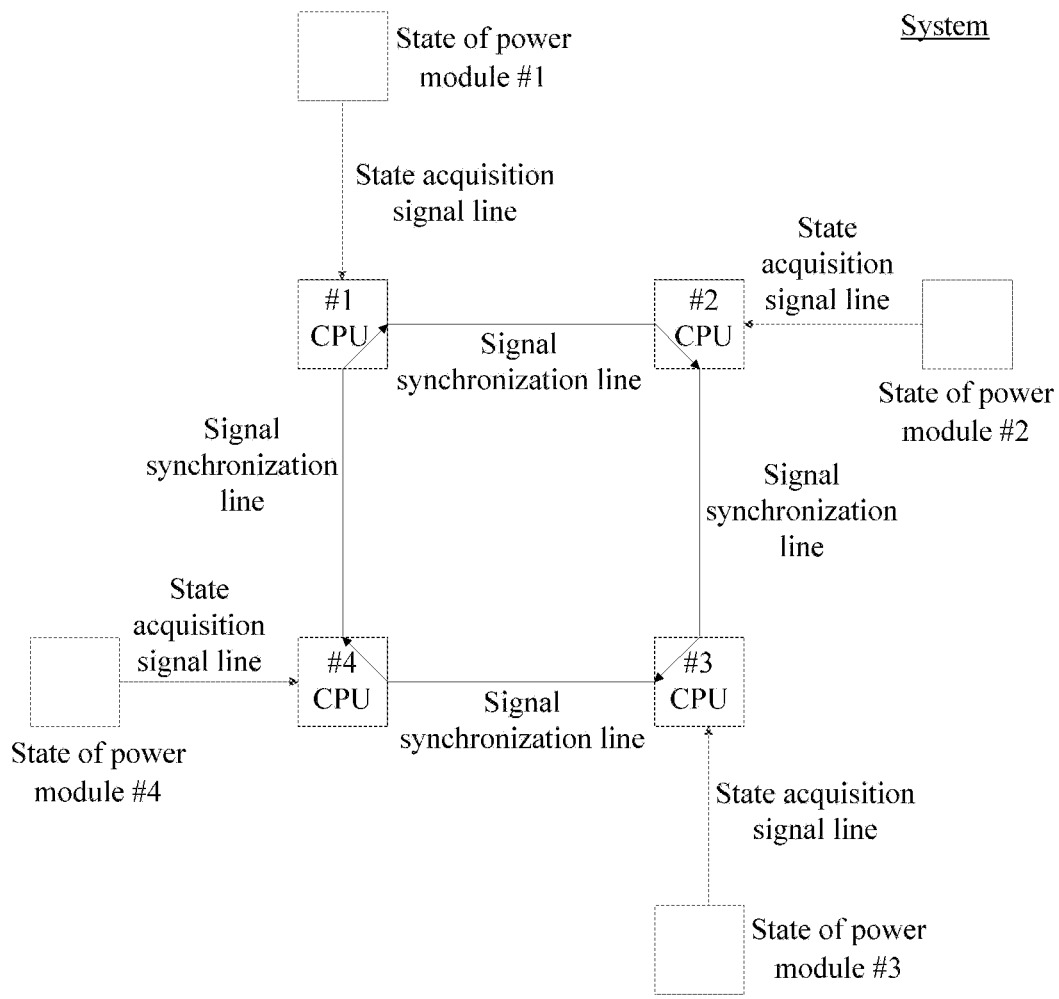
FIG. 6 is a schematic structural diagram of a topology unit according to an embodiment of the present disclosure.

Based on this, as shown in FIG. 6, the topology unit includes a controller and a power module. The controller is a single controller. The single controller is connected to the power module via a state acquisition signal line to acquire a power module fault signal sent by the power module and sends the power module fault signal via the signal synchronization line. In this embodiment, the single controller may be implemented as any CPU.

Figure 7:
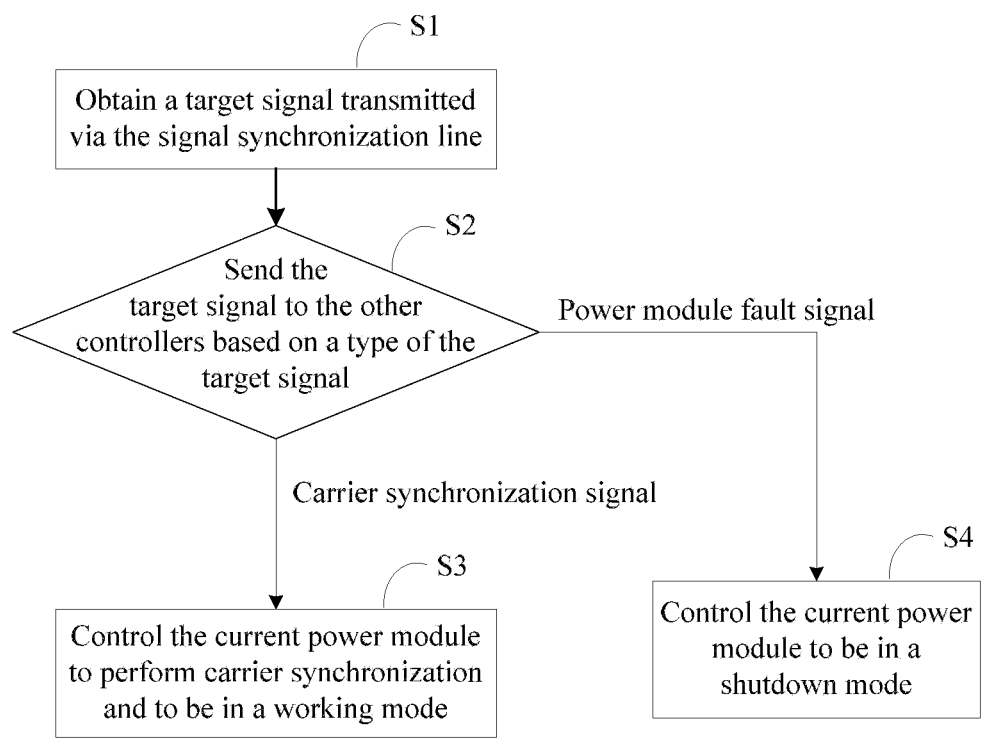
FIG. 7 is a flow chart of a method for protecting parallel-connected topology units according to an embodiment of the present disclosure.

Based on the system for protecting parallel-connected topology units, a method for protecting parallel-connected topology units is provided according to an embodiment. As shown in FIG. 7, the method includes following steps S1 to S4.

In step S1, a target signal transmitted via the signal synchronization line is obtained.

In step S2, the target signal is sent to the other controllers based on a type of the target signal.

In step S3, a current power module is controlled to perform carrier synchronization and controlled to be in a working mode if the target signal is a carrier synchronization signal.

In step S4, the current power module is controlled to be in a shutdown mode if the target signal is a power module fault signal.

In this embodiment, the controller CPU detects the type of the target signal transmitted via the signal synchronization line. If the target signal transmitted via the signal synchronization line is the carrier synchronization signal, the controller CPU performs PWM carrier synchronization and causes the current power module, that is, the power module connected to the controller CPU, to operate normally. If the target signal transmitted via the signal synchronization line is a power module fault signal, the controller CPU controls the current power module to be in a shutdown mode.

It can be seen that according to the present disclosure, the signal synchronization lines between the topology units connected in parallel are shared in a time-sharing manner. The carrier synchronization signal is transmitted through the signal synchronization line if the power module work normally, and the power module fault signal is transmitted through the signal synchronization line if the power module is faulty. Each of the topology units monitors the transmitted target signal in a real-time manner to achieve fast synchronous protection.

Figure 8:
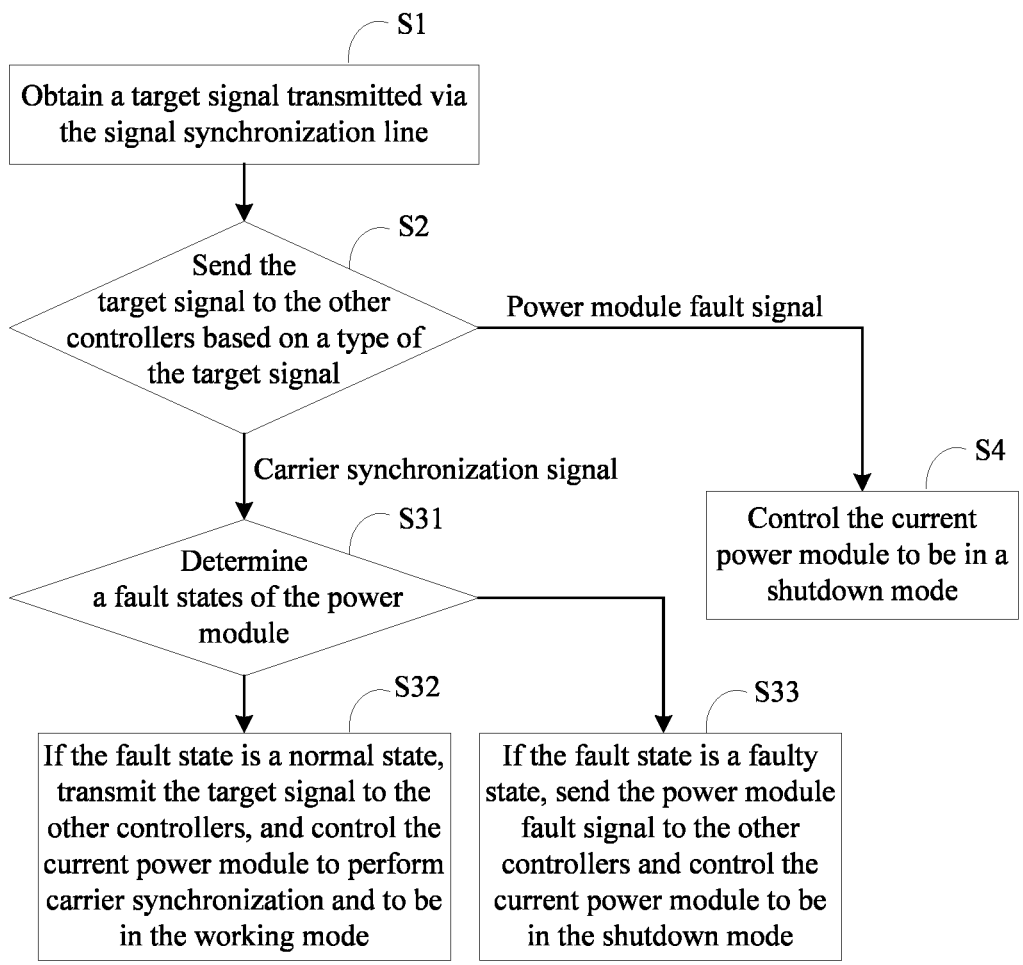
FIG. 8 is a flow chart of a method for protecting parallel-connected topology units according to another embodiment of the present disclosure.

Based on the above embodiments, as shown in FIG. 8, if the target signal is the carrier synchronization signal, the method according to the embodiment further includes following steps S31 to S33.

In step S31, a fault state of the power module is determined.

In step S32, if the fault state is a normal state, the target signal is transmitted to the other controllers, and the current power module is controlled to perform carrier synchronization and is controlled to be in the working mode.

In step S33, if the fault state is a faulty state, the power module fault signal is sent to the other controllers and the current power module is controlled to be in the shutdown mode.

In this embodiment, the controller CPU detects the type of the target signal transmitted via the signal synchronization line. If the target signal transmitted via the signal synchronization line is the carrier synchronization signal, the controller CPU detects whether the power module in the topology unit where the controller CPU is located is faulty via the state acquisition signal line. If all power modules operate normally, the controller CPU transmits the carrier synchronization signal to a next controller. The controller CPU performs PWM carrier synchronization and causes the power module to operate normally. If the power module is faulty, the controller CPU suspends sending the carrier synchronization signal and sends the power module fault signal via the signal synchronization line. If the target signal transmitted via the signal synchronization line is the power module fault signal, the power module fault signal is transparently transmitted to the next controller. The controller CPU receives the power module fault signal and the power module is shut down for protection.

In an embodiment, multiple controllers may form a ring signal network by using the signal synchronization lines. As shown in FIG. 6, a controller CPU1 transmits the target signal to a controller CPU2 via a signal synchronization line, the controller CPU2 transmits the target signal to a controller CPU3 via a signal synchronization line, the controller CPU3 transmits the target signal to a controller CPU4 via a signal synchronization line, and the controller CPU4 transmits the target signal to the controller CPU1 via a signal synchronization line.

Figure 9:
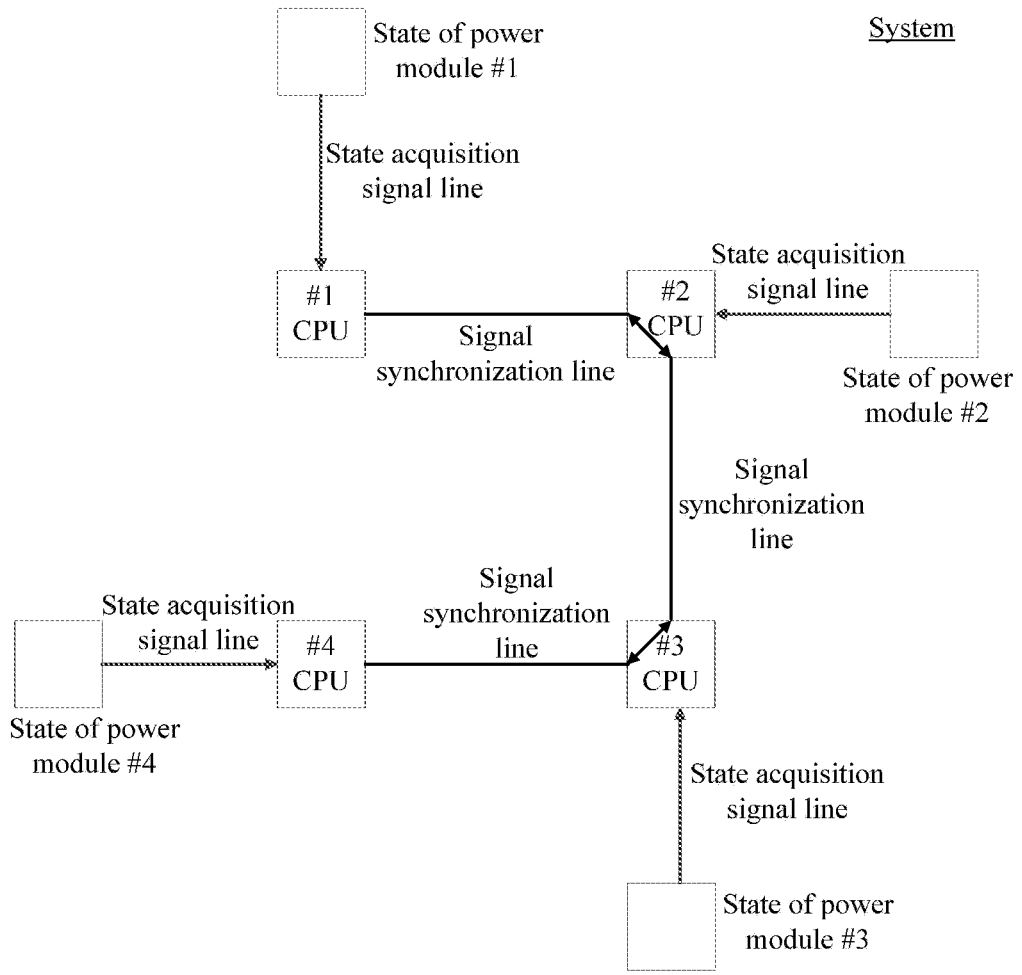
FIG. 9 is a schematic structural diagram of a topology unit according to another embodiment of the present disclosure.

Alternatively, multiple controllers may form a non-ring signal network via signal synchronization lines. As shown in FIG. 9, a controller CPU1 transmits the target signal to a controller CPU2 via a signal synchronization line, the controller CPU2 transmits the target signal to a controller CPU3 via a signal synchronization line, and the controller CPU3 transmits the target signal to a controller CPU4 via a signal synchronization line. The controller CPU4 does not transmit the target signal to the controller CPU1 via a signal synchronization line.

Figure 10:
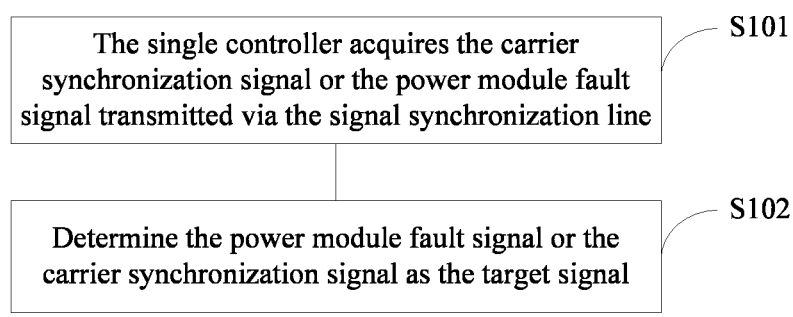
FIG. 10 is a flow chart of a method for protecting parallel-connected topology units according to another embodiment of the present disclosure.

Based on the above embodiments, an implementation for obtaining the target signal transmitted via the signal synchronization line is provided according to an embodiment of the present disclosure. As shown in FIG. 10, the implementation includes following step S101 and S102.

In step S101, the single controller acquires the carrier synchronization signal or the power module fault signal transmitted via the signal synchronization line.

In step S102, the power module fault signal or the carrier synchronization signal is determined as the target signal.

In a normal state, the carrier synchronization signal is transmitted via the signal synchronization line. In this case, the target signal is the carrier synchronization signal, for performing PWM carrier synchronization. If the power module fault signal is transmitted via the signal synchronization line, the target signal is the power module fault signal, for notifying another controller to control the corresponding power module to be shut down.

Figure 11:
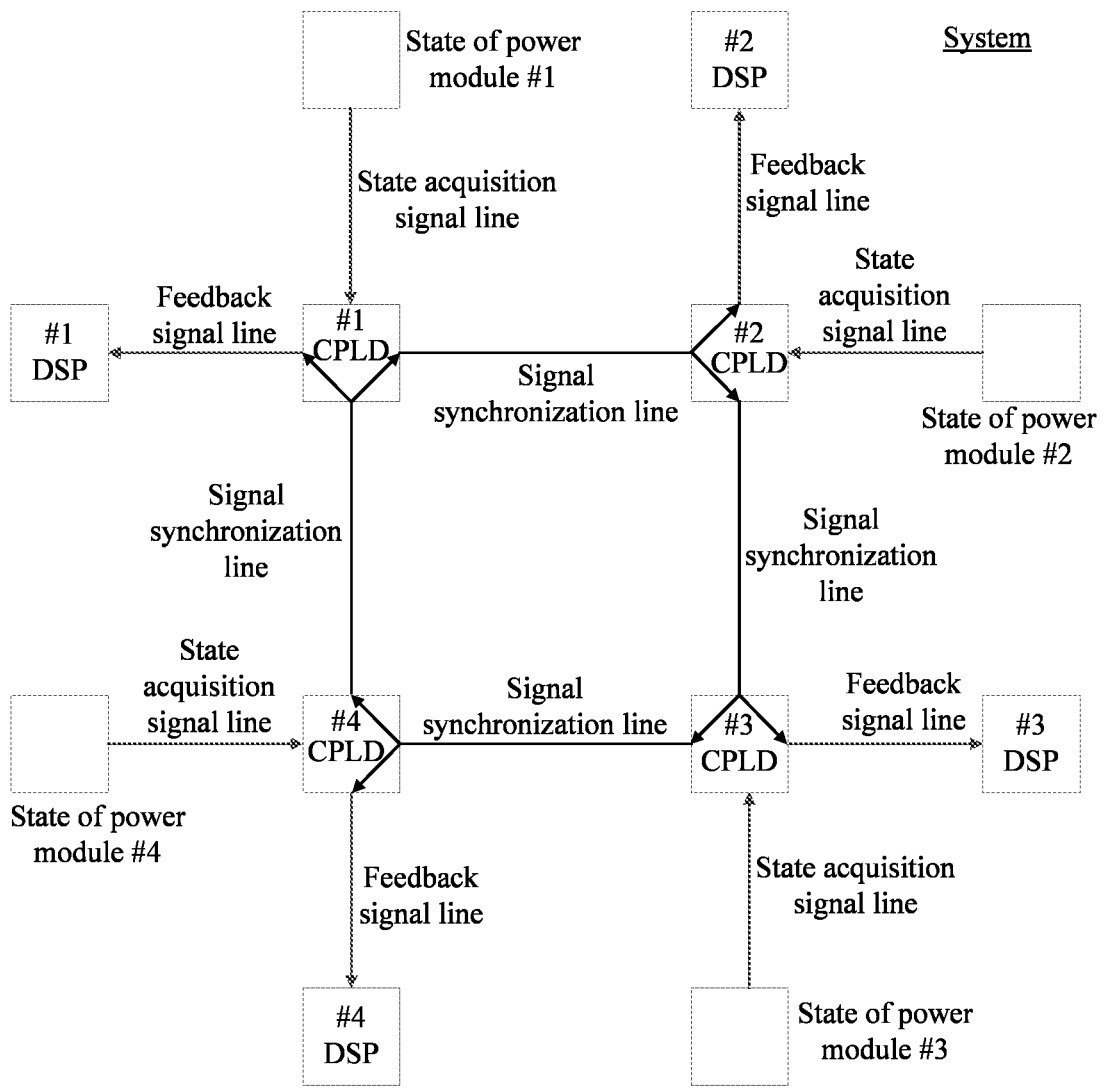
FIG. 11 is a schematic structural diagram of a topology unit according to another embodiment of the present disclosure.

In an embodiment, as shown in FIG. 11, the controller may be a combination of a first sub-controller and a second sub-controller. In this embodiment, the first sub-controller is defined as a main controller DSP, and the second sub-controller is defined as an auxiliary controller CPLD, the first sub-controller is connected to the second sub-controller via a feedback signal line, the second sub-controller is connected to at least one of other second sub-controllers via the signal synchronization line, and the second sub-controller is connected to the power module via the state acquisition signal line.

Figure 12:
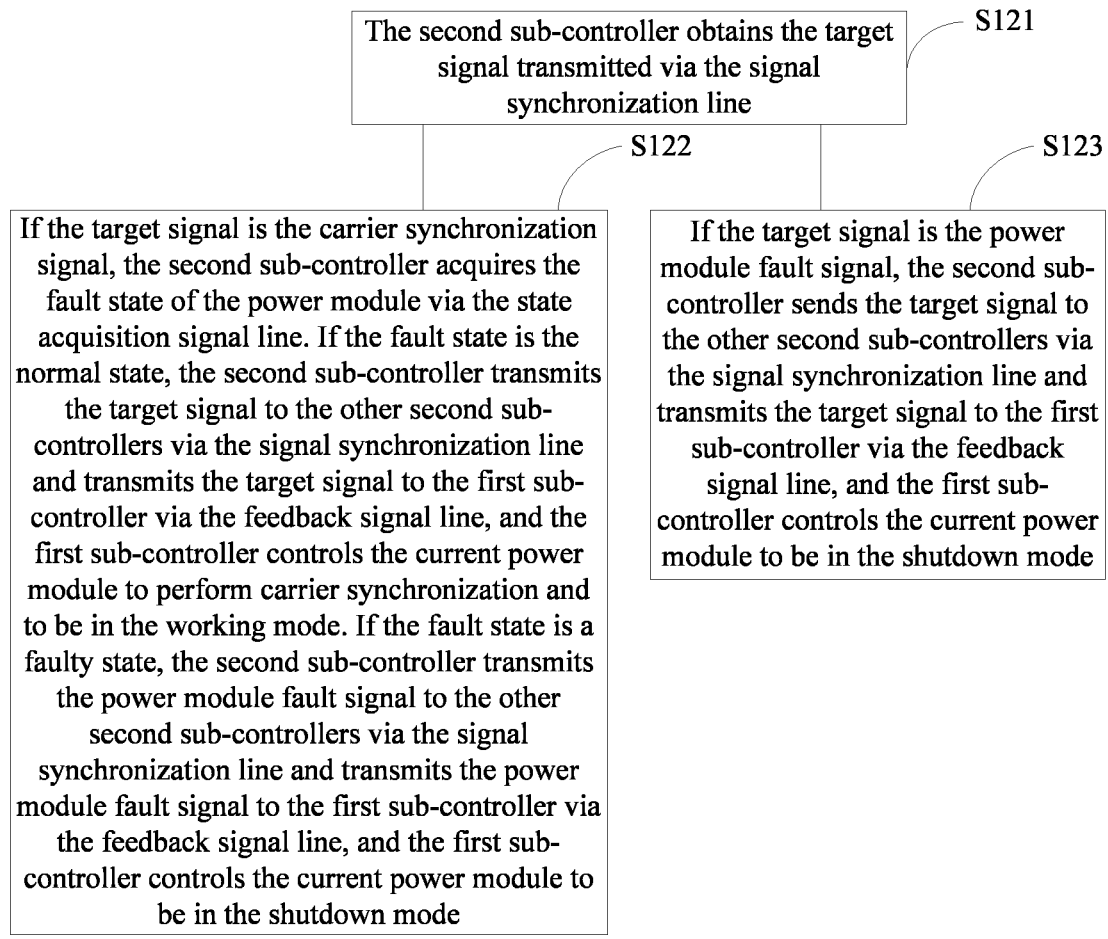
FIG. 12 is a flow chart of a method for protecting parallel-connected topology units according to another embodiment of the present disclosure.

Correspondingly, as shown in FIG. 12, another implementation for obtaining the target signal transmitted via the signal synchronization line is provided according to an embodiment of the present disclosure. The implementation includes following step S121 and S123.

In step S121, the second sub-controller obtains the target signal transmitted via the signal synchronization line.

In step S122, if the target signal is the carrier synchronization signal, the second sub-controller acquires the fault state of the power module via the state acquisition signal line. If the fault state is the normal state, the second sub-controller transmits the target signal to the other second sub-controllers via the signal synchronization line and transmits the target signal to the first sub-controller via the feedback signal line, and the first sub-controller controls the current power module to perform carrier synchronization and controls the current power module to be in the working mode. If the fault state is a faulty state, the second sub-controller transmits the power module fault signal to the other second sub-controllers via the signal synchronization line and transmits the power module fault signal to the first sub-controller via the feedback signal line, and the first sub-controller controls the current power module to be in the shutdown mode.

In step S123, if the target signal is the power module fault signal, the second sub-controller sends the target signal to the other second sub-controllers via the signal synchronization line and transmits the target signal to the first sub-controller via the feedback signal line, and the first sub-controller controls the current power module to be in the shutdown mode.

It should be noted that in this embodiment, the second sub-controller may constantly acquire the fault state of the power module via the state acquisition signal line. The acquisition of the fault state is not limited to being performed in the case that the target signal is the carrier synchronization signal.

Figure 13:
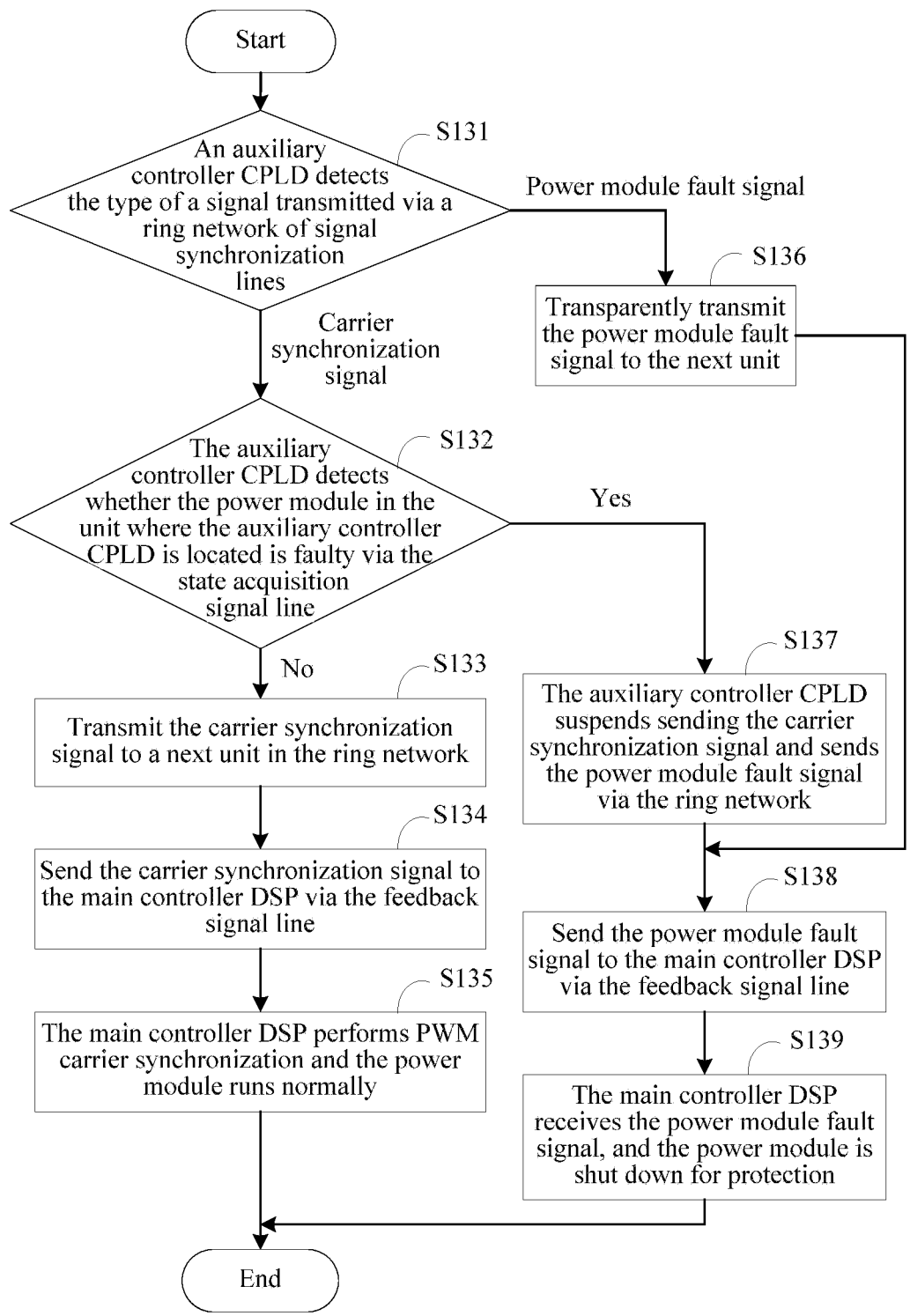
FIG. 13 is a flow chart of a method for protecting parallel-connected topology units according to another embodiment of the present disclosure.

A method for protecting parallel-connected topology units is provided according to another embodiment of the present disclosure. As shown in FIG. 13, the method includes following steps S131 to S139.

In step S131, an auxiliary controller CPLD detects the type of a signal transmitted via a ring network of signal synchronization lines.

In step S132, if the carrier synchronization signal is transmitted via the ring network, the auxiliary controller CPLD detects whether the power module in the unit where the auxiliary controller CPLD is located is faulty via the state acquisition signal line.

In step S133, if none of other power modules in the ring network and the power module in the unit where the auxiliary controller CPLD is located is faulty, the carrier synchronization signal is transmitted to a next unit in the ring network.

In step S134, the carrier synchronization signal is sent to the main controller DSP via the feedback signal line.

In step S135, the main controller DSP performs PWM carrier synchronization and the power module runs normally.

In step S136, if the power module fault signal is transmitted via the ring network, the power module fault signal is transparently transmitted to the next unit.

In step S137, if the power module in the unit where the auxiliary controller CPLD is located is faulty, the auxiliary controller CPLD suspends sending the carrier synchronization signal and sends the power module fault signal via the ring network.

In step S138, the power module fault signal is sent to the main controller DSP via the feedback signal line.

In step S139, the main controller DSP receives the power module fault signal, and the power module is shut down for protection.

Figure 14:
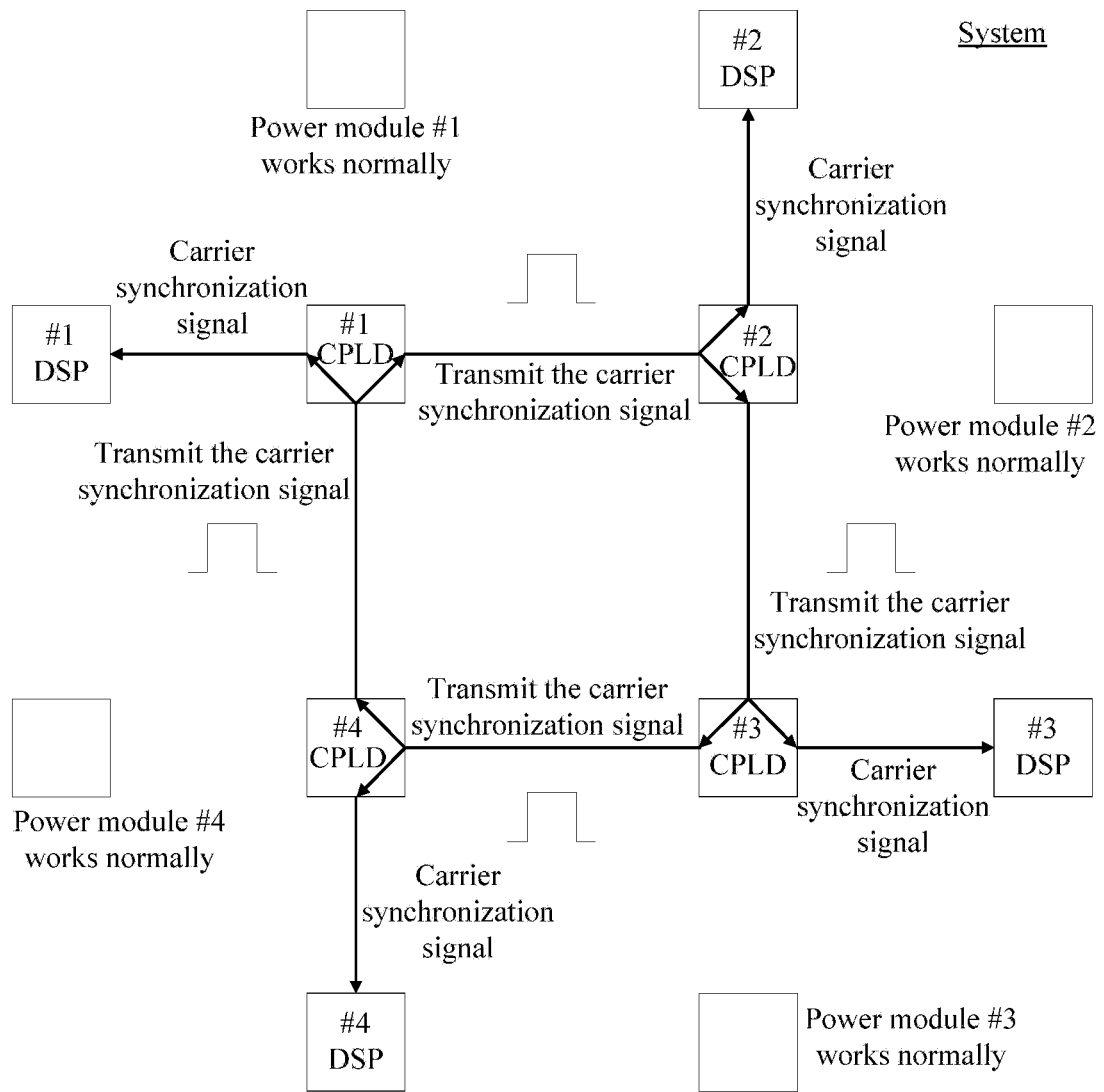
FIG. 14 is a schematic structural diagram of a topology unit according to another embodiment of the present disclosure.

Referring to FIG. 14, if the power module works normally, the power module fault signal is not detected by auxiliary controllers CPLD in all the units, and the carrier synchronization signal is transmitted via the ring network of signal synchronization lines. On reception of the carrier synchronization signal, the auxiliary controllers CPLD feed the carrier synchronization signal back to respective main controllers DSP to ensure PWM carrier synchronization and normal operation of all the units.

Figure 15:
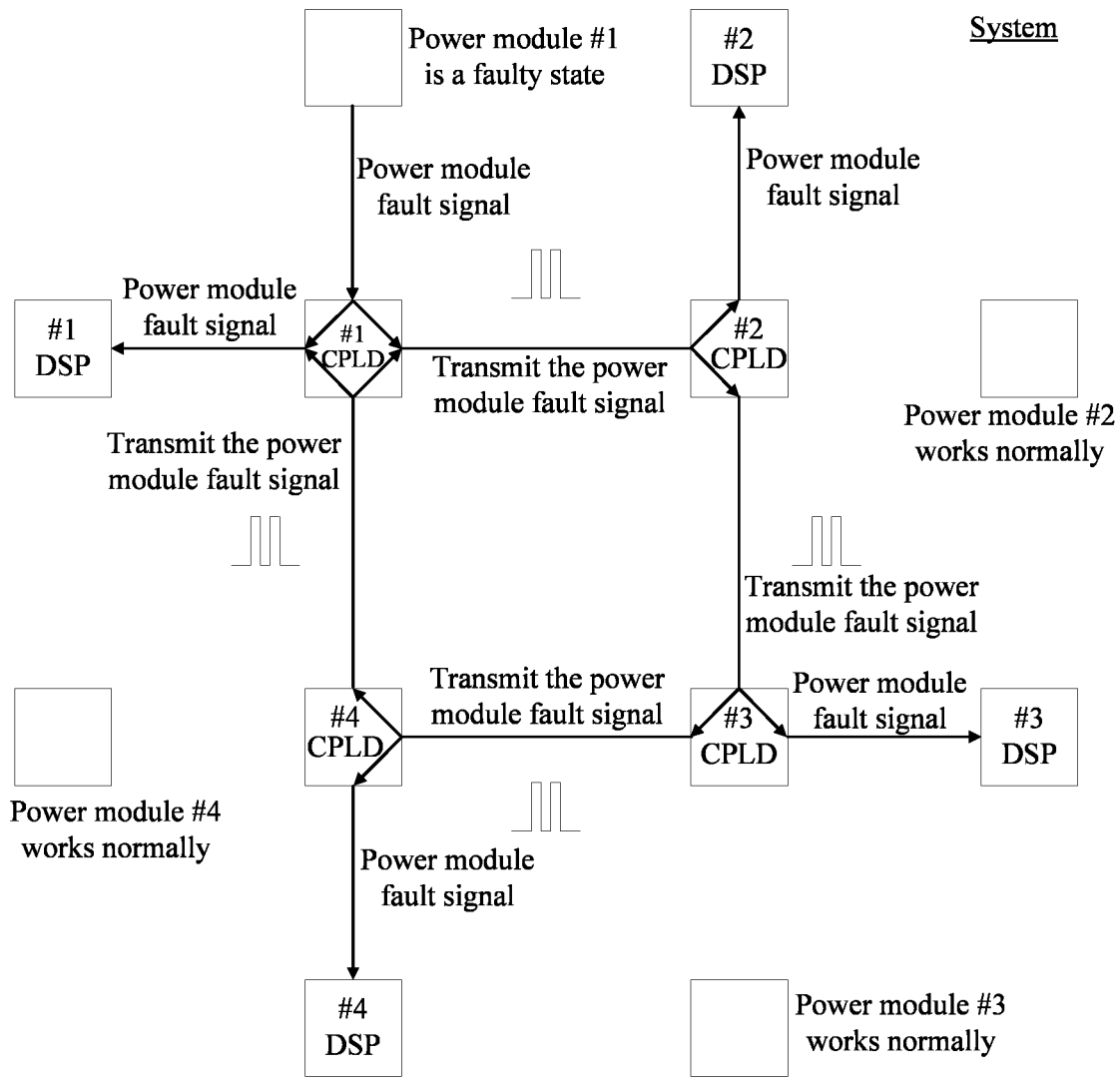
FIG. 15 is a schematic structural diagram of a topology unit according to another embodiment of the present disclosure.

If the power module in one of the topology units (for example, #1) is faulty, the auxiliary controller CPLD in the topology unit detects the power module fault signal, suspends sending the carrier synchronization signal and sends the power module fault signal, for example, high-frequency pulses, via the ring network of signal synchronization lines. As shown in FIG. 15, on reception of the power module fault signal, auxiliary controllers CPLD in other units transparently transmit the power module fault signal to a next unit in the ring network, and feed the power module fault signal back to respective main controllers DSP.

Figure 16:
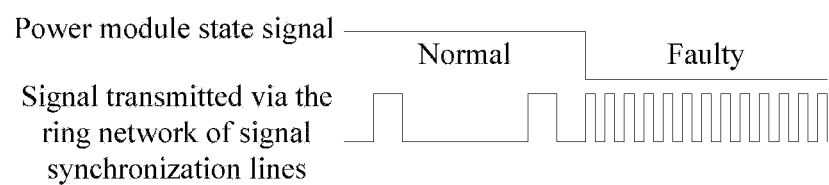
FIG. 16 is a schematic diagram of a carrier synchronization signal and a power module fault signal according to an embodiment of the present disclosure.
Figure 17:
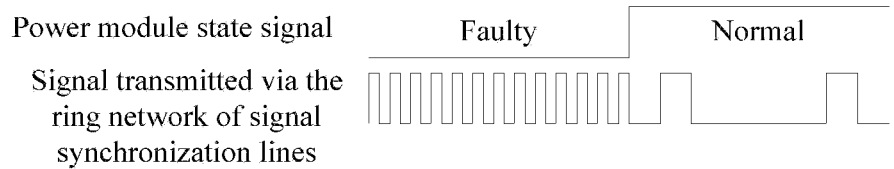
FIG. 17 is a schematic diagram of a carrier synchronization signal and a power module fault signal according to another embodiment of the present disclosure.

It should be noted that in this embodiment, if the power module switches from the normal state to the faulty state, the signal transmitted via the signal synchronization line is changed from the carrier synchronization pulse to the power module fault signal, for example, as shown in FIG. 16, changed from low-frequency pulses to high-frequency pulses. When the fault of the power module is cleared, the carrier synchronization signal is transmitted via the ring network of signal synchronization lines, for example, as shown in FIG. 17, the high-frequency pulses is replaced by low-frequency pulses.

Figure 18:
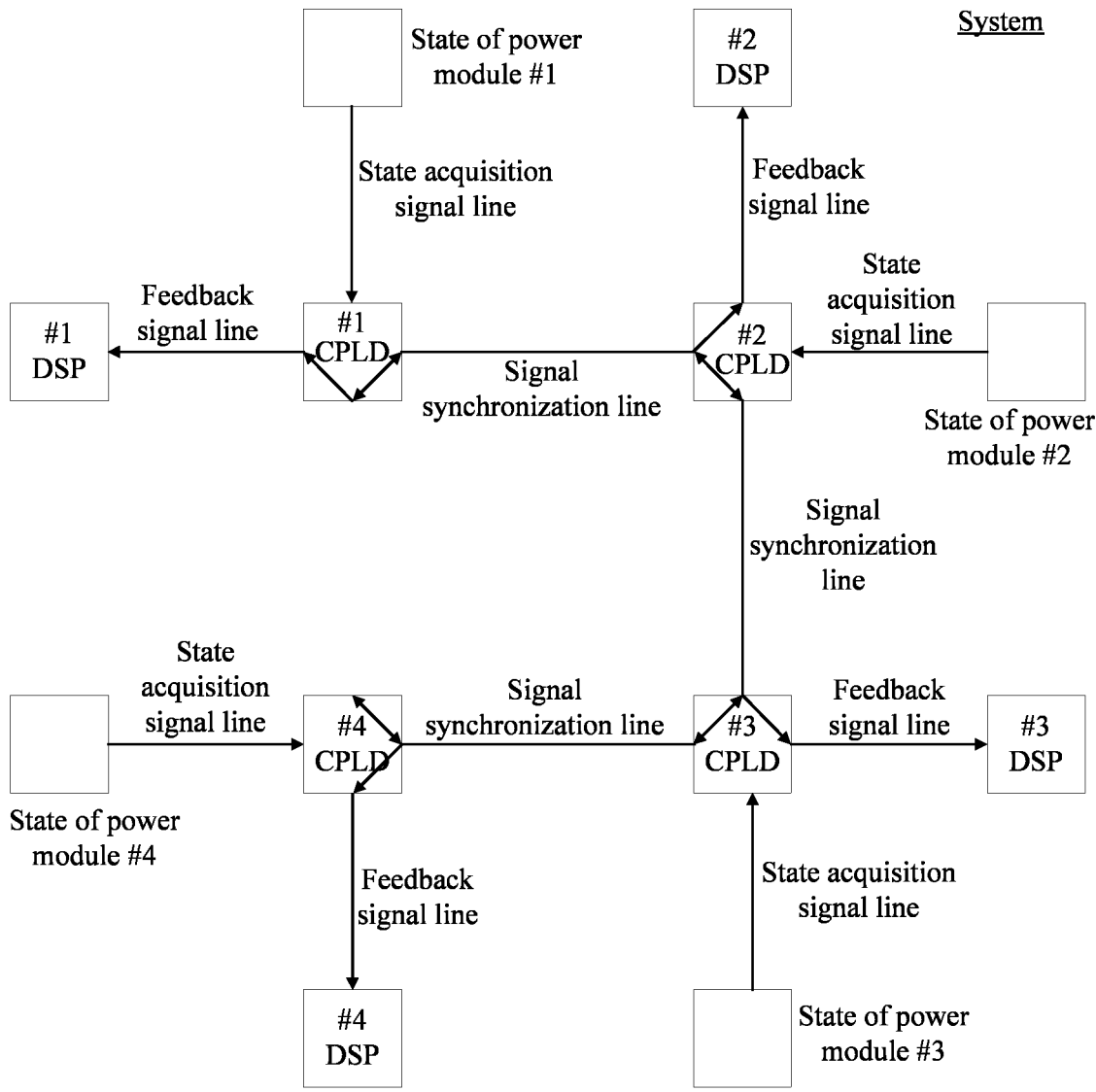
FIG. 18 is a schematic structural diagram of a topology unit according to another embodiment of the present disclosure.

The carrier synchronization signal and the power module fault signal may be signals in other forms. In addition, if the controller includes a first sub-controller and a second sub-controller, all the second sub-controllers may be connected into a ring network as shown in FIG. 11 or may be connected into a non-ring network as shown in FIG. 18.

Figure 19:
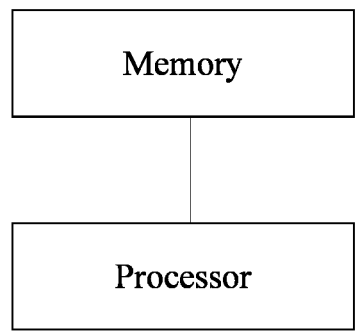
FIG. 19 shows a schematic structural diagram of a device for protecting parallel-connected topology units according to an embodiment of the present disclosure.

Based on the above embodiments, as shown in FIG. 19, a device for protecting parallel-connected topology units applied to a system for protecting parallel-connected topology units is provided according to an embodiment. The system for protecting parallel-connected topology units includes topology units connected in parallel, each of the topology units includes a controller and a power module, the controller performs signal transmission with at least one of other controllers via a signal synchronization line, and the device for protecting parallel-connected topology units may include a memory and a processor, the memory storing executable instructions. Specifically, the device for protecting parallel-connected topology units includes: an obtaining module, a sending module, and a control module.

The obtaining module is configured to obtain a target signal transmitted via the signal synchronization line.

The sending module is configured to send the target signal to the other controllers based on a type of the target signal.

The control module is configured to control a current power module to perform carrier synchronization and control the current power module to be in a working mode if the target signal is a carrier synchronization signal, and control the current power module to be in a shutdown mode if the target signal is a power module fault signal.

The device for protecting parallel-connected topology units according to this embodiment may further include a determining module.

The determining module is configured to, if the target signal is the carrier synchronization signal, determine a fault state of the power module. The determining module is configured to, if the fault state is a normal state, transmit the target signal to the other controllers, control the current power module to perform carrier synchronization and control the current power module to be in the working mode, and if the fault state is a faulty state, send the power module fault signal to the other controllers and control the current power module to be in the shutdown mode.

In an embodiment, the controller is a single controller, the single controller is connected to the power module via a state acquisition signal line, the single controller acquires the power module fault signal sent by the power module and sends the power module fault signal via the signal synchronization line. Correspondingly, the obtaining module includes: a first acquiring unit and a determining unit.

The first acquiring unit is configured to acquire, by controller, the carrier synchronization signal or the power module fault signal transmitted via the signal synchronization line.

The determining unit is configured to determine the power module fault signal or the carrier synchronization signal as the target signal.

One can refer to the above method embodiments for the working principle of the device, which is not repeated herein.

In addition, a system for protecting parallel-connected topology units is provided. The system including topology units connected in parallel, each of the topology units includes a controller and a power module, the controller performs signal transmission with at least one of other controllers via a signal synchronization line.

The controller obtains a target signal transmitted via the signal synchronization line.

The controller sends the target signal to the other controllers based on a type of the target signal. The controller controls a current power module to perform carrier synchronization and controls the current power module to be in a working mode if the target signal is a carrier synchronization signal, and controls the current power module to be in a shutdown mode if the target signal is a power module fault signal.

In an embodiment, the controller is a single controller, the single controller is connected to the power module via a state acquisition signal line, the single controller acquires the power module fault signal sent by the power module and sends the power module fault signal via the signal synchronization line. Correspondingly, the controller obtaining the target signal transmitted via the signal synchronization line includes the single controller being configured to:

acquire the carrier synchronization signal or the power module fault signal transmitted via the signal synchronization line, and determine the power module fault signal or the carrier synchronization signal as the target signal.

In an embodiment, the controller includes a first sub-controller and a second sub-controller, the first sub-controller is connected to the second sub-controller via a feedback signal line, the second sub-controller performs signal transmission with at least one of other second sub-controllers via the signal synchronization line, and the second sub-controller is connected to the power module via a state acquisition signal line. Correspondingly, the controller obtaining the target signal transmitted via the signal synchronization line includes:

if the target signal is the carrier synchronization signal, the second sub-controller acquiring a fault state of the power module via the state acquisition signal line. If the fault state is a normal state, the second sub-controller transmits the target signal to the other second sub-controllers via the signal synchronization line and transmits the target signal to the first sub-controller via the feedback signal line, and the first sub-controller controls the current power module to perform carrier synchronization and controls the current power module to be in the working mode. If the fault state is a faulty state, the second sub-controller transmits the power module fault signal to the other second sub-controllers via the signal synchronization line and transmits the power module fault signal to the first sub-controller via the feedback signal line, and the first sub-controller controls the current power module to be in the shutdown mode.

If the target signal is the power module fault signal, the second sub-controller sends the target signal to the other second sub-controllers via the signal synchronization line and transmits the target signal to the first sub-controller via the feedback signal line, and the first sub-controller controls the current power module to be in the shutdown mode.

It can be seen that in the system for protecting parallel-connected topology units, the signal synchronization lines between the topology units connected in parallel are shared in a time-sharing manner. The carrier synchronization signal is transmitted via the signal synchronization line if the power module works normally, and the power module fault signal is transmitted via the signal synchronization line if the power module is faulty. Each of the topology units monitors the transmitted target signal in a real time manner to achieve fast synchronous protection.

In summary, a method, a device, and a system for protecting parallel-connected topology units are provided according to the present disclosure. The target signal transmitted via the signal synchronization line is first obtained, and the target signal is sent to the other controllers based on a type of the target signal. If the target signal is the carrier synchronization signal, the current power module is controlled to perform carrier synchronization and is controlled to be in a working mode. If the target signal is the power module fault signal, the current power module is controlled to be in the shutdown mode. It can be seen that in the present disclosure, the signal synchronization lines between the topology units connected in parallel are shared in a time-sharing manner. The carrier synchronization signal is transmitted via the signal synchronization line if the power module works normally, and the power module fault signal is transmitted via the signal synchronization line if the power module is faulty. Each of the topology units monitors the transmitted target signal in a real time manner to achieve fast synchronous protection.

The embodiments in this specification are described in a progressive way, each of which emphasizes the differences from others, and the same or similar parts among the embodiments can be referred to each other. Since the device disclosed in the embodiments corresponds to the method therein, the description thereof is relatively simple, and for relevant matters references may be made to the description of the method.

It may be known by those skilled in the art that, units and algorithm steps in each examples described in conjunction with the embodiments disclosed herein can be realized by electronic hardware, computer software or a combination thereof. In order to clearly illustrate interchangeability of the hardware and the software, steps and composition of each embodiment have been described generally in view of functions in the above specification. Whether the function is executed in a hardware way or in a software way depends on application of the technical solution and design constraint condition. Those skilled in the art can use different method for each application to realize the described function, and this is not considered to be beyond the scope of the application.

The steps of the methods or algorithms described in conjunction with the embodiments of the present disclosure can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, CD-ROM, or other types of storage media well known in the technical field.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A method for protecting parallel-connected topology units, applied to a system for protecting parallel-connected topology units, wherein the system for protecting parallel-connected topology units comprises topology units connected in parallel, each of the topology units comprises a controller and a power module, the controller performs signal transmission with at least one of other controllers via a signal synchronization line, and the method for protecting parallel-connected topology units comprises:

obtaining a target signal transmitted via the signal synchronization line, the target signal being a carrier synchronization signal or a power module fault signal, and the power module fault signal being uploaded to the signal synchronization line in a case that the controller detects that the corresponding power module fails;

sending the target signal to the other controllers based on a type of the target signal; and by multiplexing the signal synchronization line, controlling a current power module to perform carrier synchronization and controlling the current power module to be in a working mode if the target signal is the carrier synchronization signal, and controlling the current power module to be in a shutdown mode if the target signal is the power module fault signal.

2. The method for protecting parallel-connected topology units according to claim 1, further comprising, if the target signal is the carrier synchronization signal:

determining a fault state of the power module, if the fault state is a normal state, transmitting the target signal to the other controllers, controlling the current power module to perform carrier synchronization and controlling the current power module to be in the working mode, and if the fault state is a faulty state, sending the power module fault signal to the other controllers and controlling the current power module to be in the shutdown mode.

3. The method for protecting parallel-connected topology units according to claim 1, wherein the controller is a single controller, the single controller is connected to the power module via a state acquisition signal line, the single controller acquires the power module fault signal sent by the power module and sends the power module fault signal via the signal synchronization line, and the obtaining the target signal transmitted via the signal synchronization line comprises:

acquiring, by the single controller, the carrier synchronization signal or the power module fault signal transmitted via the signal synchronization line, and determining the power module fault signal or the carrier synchronization signal as the target signal.

4. The method for protecting parallel-connected topology units according to claim 1, wherein the controller comprises a first sub-controller and a second sub-controller, the first sub-controller is connected to the second sub-controller via a feedback signal line, the second sub-controller performs signal transmission with at least one of other second sub-controllers via the signal synchronization line, and the second sub-controller is connected to the power module via a state acquisition signal line, and the second sub-controller obtains the target signal transmitted via the signal synchronization line, if the target signal is the carrier synchronization signal, the second sub-controller acquires a fault state of the power module via the state acquisition signal line, wherein if the fault state is a normal state, the second sub-controller transmits the target signal to the other second sub-controllers via the signal synchronization line and transmits the target signal to the first sub-controller via the feedback signal line, and the first sub-controller performs carrier synchronization and controls the current power module to be in the working mode, and if the fault state is a faulty state, the second sub-controller transmits the power module fault signal to the other second sub-controllers via the signal synchronization line and transmits the power module fault signal to the first sub-controller via the feedback signal line, and the first sub-controller controls the current power module to be in the shutdown mode, if the target signal is the power module fault signal, the second sub-controller sends the target signal to the other second sub-controllers via the signal synchronization line and transmits the target signal to the first sub-controller via the feedback signal line, and the first sub-controller controls the current power module to be in the shutdown mode.

5. A device for protecting parallel-connected topology units, applied to a system for protecting parallel-connected topology units, wherein the system for protecting parallel-connected topology units comprises topology units connected in parallel, each of the topology units comprises a controller and a power module, and the controller performs signal transmission with at least one of other controllers via a signal synchronization line;

wherein the device for protecting parallel-connected topology units comprises a memory and a processor, the memory storing executable instructions, and the processor being configured to execute the executable instructions to:

obtain a target signal transmitted via the signal synchronization line, the target signal being a carrier synchronization signal or a power module fault signal, and the power module fault signal being uploaded to the signal synchronization line in a case that the controller detects that the corresponding power module fails;

send the target signal to the other controllers based on a type of the target signal; and by multiplexing the signal synchronization line, control a current power module to perform carrier synchronization and control the current power module to be in a working mode if the target signal is the carrier synchronization signal, and control the current power module to be in a shutdown mode if the target signal is the power module fault signal.

6. The device for protecting parallel-connected topology units according to claim 5, the processor is configured to execute the executable instructions to:

determine a fault state of the power module if the target signal is the carrier synchronization signal, wherein if the fault state is a normal state, transmit the target signal to the other controllers, control the current power module to perform carrier synchronization and control the current power module to be in the working mode, and if the fault state is a faulty state, send the power module fault signal to the other controllers and control the current power module to be in the shutdown mode.

7. The device for protecting parallel-connected topology units according to claim 5, wherein the controller is a single controller, the single controller is connected to the power module via a state acquisition signal line, the single controller acquires the power module fault signal sent by the power module and sends the power module fault signal via the signal synchronization line, and the processor is configured to execute the executable instructions to:

acquire, by controller, the carrier synchronization signal or the power module fault signal transmitted via the signal synchronization line, and determine the power module fault signal or the carrier synchronization signal as the target signal.

8. A system for protecting parallel-connected topology units, comprising topology units connected in parallel, each of the topology units comprises a controller and a power module, the controller performs signal transmission with at least one of other controllers via a signal synchronization line, and the controller:
- obtains a target signal transmitted via the signal synchronization line, the target signal being a carrier synchronization signal or a power module fault signal, and the power module fault signal being uploaded to the signal synchronization line in a case that the controller detects that the corresponding power module fails;
- sends the target signal to the other controllers based on a type of the target signal; and
- by multiplexing the signal synchronization line, controls a current power module to perform carrier synchronization and controls the current power module to be in a working mode if the target signal is the carrier synchronization signal, and controls the current power module to be in a shutdown mode if the target signal is the power module fault signal.

9. The system for protecting parallel-connected topology units according to claim 8, wherein
the controller is a single controller, the single controller is connected to the power module via a state acquisition signal line, the single controller acquires the power module fault signal sent by the power module and sends the power module fault signal via the signal synchronization line, and the controller obtaining the target signal transmitted via the signal synchronization line comprises the single controller being configured to:
- acquire the carrier synchronization signal or the power module fault signal transmitted via the signal synchronization line, and
- determine the power module fault signal or the carrier synchronization signal as the target signal.

10. The system for protecting parallel-connected topology units according to claim 8, wherein
the controller comprises a first sub-controller and a second sub-controller, the first sub-controller is connected to the second sub-controller via a feedback signal line, the second sub-controller performs signal transmission with at least one of other second sub-controllers via the signal synchronization line, and the second sub-controller is connected to the power module via a state acquisition signal line, and the controller obtaining the target signal transmitted via the signal synchronization line comprises:
if the target signal is the carrier synchronization signal, the second sub-controller acquiring a fault state of the power module via the state acquisition signal line, wherein
- if the fault state is a normal state, the second sub-controller transmits the target signal to the other second sub-controllers via the signal synchronization line and transmits the target signal to the first sub-controller via the feedback signal line, and the first sub-controller performs carrier synchronization and controls the current power module to be in the working mode, and
- if the fault state is a faulty state, the second sub-controller transmits the power module fault signal to the other second sub-controllers via the signal synchronization line and transmits the power module fault signal to the first sub-controller via the feedback signal line, and the first sub-controller controls the current power module to be in the shutdown mode, if the target signal is the power module fault signal, the second sub-controller sends the target signal to the other second sub-controllers via the signal synchronization line and transmits the target signal to the first sub-controller via the feedback signal line, and the first sub-controller controls the current power module to be in the shutdown mode.

* * * * *